United States Patent [19]

Lavallee

[11] 4,028,953

[45] June 14, 1977

[54] VARIABLE DIAMETER PULLEY

[75] Inventor: Real Lavallee, Drummondville, Canada

[73] Assignee: Gilles Soucy, Drummondville, Canada

[22] Filed: Jan. 7, 1976

[21] Appl. No.: 646,999

[52] U.S. Cl. .................................. 74/230.17 E
[51] Int. Cl.² .................................. F16H 55/56
[58] Field of Search .......... 74/230.17 E; 192/105 C

[56] References Cited

UNITED STATES PATENTS

| 1,618,644 | 2/1927 | Dickson | 192/105 |
|---|---|---|---|
| 2,709,372 | 5/1955 | Melone | 74/230.17 |
| 3,066,546 | 12/1962 | Thostenson | 74/230.17 E |
| 3,266,330 | 8/1966 | Galleher | 74/230.17 E |
| 3,362,242 | 1/1968 | Watkins | 74/230.17 E |
| 3,394,607 | 7/1968 | Hubert | 74/230.17 |
| 3,491,609 | 7/1968 | Henriksen | 74/230.17 |
| 3,574,366 | 4/1971 | Thostenson | 74/230.17 E |
| 3,599,504 | 8/1971 | Taylor | 74/230.17 E |
| 3,680,403 | 8/1972 | Schupan | 74/230.17 E |
| 3,685,366 | 8/1972 | Schupan | 74/230.17 E |
| 3,757,593 | 9/1973 | Svenson | 74/230.17 E |
| 3,777,583 | 12/1973 | Talbot | 74/230.17 E |

FOREIGN PATENTS OR APPLICATIONS

| 1,205,727 | 2/1960 | France | 74/230.17 E |

*Primary Examiner*—Samuel Scott
*Assistant Examiner*—Allan R. Burke
*Attorney, Agent, or Firm*—Raymond A. Robic; Arthur Schwartz; Francis B. Francois

[57] ABSTRACT

A centrifugally operated variable diameter pulley. The pulley has a rotatable axle with a fixed pulley flange, a movable pulley flange and a fixed cover on the axle. Means are provided between the cover and movable flange, which are selectable positionable, to move the movable flange toward the fixed flange at continuous variable speed.

5 Claims, 8 Drawing Figures

VARIABLE DIAMETER PULLEY

This invention is directed toward improvements in variable diameter pulleys, and more particularly, centrifugally operated, variable diameter pulleys.

Variable diameter pulleys for use in belt and pulley drive systems to transmit power are well known. These pulleys have a fixed flange, and an axially movable flange, both mounted on an axle and both of generally frustoconical shape. The drive belt of the system is mounted about the axle between the flanges. When the system employing the pulley is at rest, the movable flange is usually spaced far enough from the fixed flange so that the belt rests on the axle. When the system is initially operated, the axle is rotated, actuating centrifugally operated means which cause the movable flange to move axially toward the fixed flange. The belt is thus engaged between the flanges clutching in the system. As the speed of rotation of the axle is increased the flanges are moved still closer together and the belt moves radially out on the flanges toward their outer peripheral edge, to smoothly change the transmission drive ratio of the system. Examples of these known pulleys are shown in U.S. Pat. No. 3,066,546, issued Dec. 4, 1962, L. D. Thostenson inventor; and U.S. Pat. No. 3,599,504, issued Aug. 17, 1971, C. F. Taylor inventor.

Transmission systems, with the above pulleys are frequently used in small vehicles such as golf carts, all-terrain vehicles, or snowmobiles. However, several models of pulleys must usually be provided in order to obtain the best possible manner of power transmission for all the various sizes of the particular type of vehicle being manufactured.

For example, snowmobiles are made in many models ranging from low powered, slow speed, pleasure machines, to high powered, high speed. In the lower powered machines a slow, very smooth transition from starting to operating speed is highly desirable while a very quick transition, even if rough or uneven, from starting to operating speed is required in high powered machines. The pulley designed for either type of machine will not do a proper job for the other machine. Thus several different types of pulley models, each designed for a specific model of machine, must be provided.

It is the purpose of the present invention to provide a variable drive pulley which can, in one model and with simple adaptation, be used to provide a range of transition speeds going from slow, smooth transitions from start to operating speed for low powered machines to quick rougher transitions from start or operating speed for high powered machines.

Being able to use one pulley model in several vehicle models greatly reduces costs.

In accordance with the present invention, a variable diameter pulley is provided which can be selectively operable to move the movable flange toward the fixed flange at one of two, or more, rates of speed, ranging from a slow, even speed suitable for low powered pleasure vehicles to a higher, more uneven speed suitable for high powered vehicles. More specifically, the pulley is provided with several sets of radially extending guide means. The sets of guide means differ from one another by the rate at which they guide centrifugally movable means to move the movable pulley toward the fixed pulley. When installing the pulley during manufacture, the centrifugally movable means, which preferably comprise circular disks, are inserted into that particular set of guide means which will give a power transmission performance suited for the particular model of machine in which the pulley is to be used. If a low powered, low speed machine is being manufactured the pulley of the present invention is assembled with the circular disks in a set of guide means which guide the disks, as they are moved radially outwardly by centrifugal force, in a manner to move the movable flange toward the fixed flange at a slow, relatively even rate. On the other hand, if a high powered machine is being manufactured, the pulley of the present invention is assembled with the circular disks in a different set of guide means which guide the disks in a manner to move the movable pulley flange toward the fixed flange at a faster rate.

The invention is more specifically directed toward a centrifugally-operated, variable diameter pulley having a rotatable axle, a first pulley flange fixed on the axle, a second pulley flange mounted on the axle and movable axially therealong, and a cover member fixed on the axle. Means, which are selectively positionable, are provided between the cover and second flange to move the second flange away from the cover and toward the first flange at one of at least two different rates, depending on the selected position, when the axle is rotated.

An embodiment of the invention will now be described in detail having reference to the accompanying drawings in which.

Figure 1:
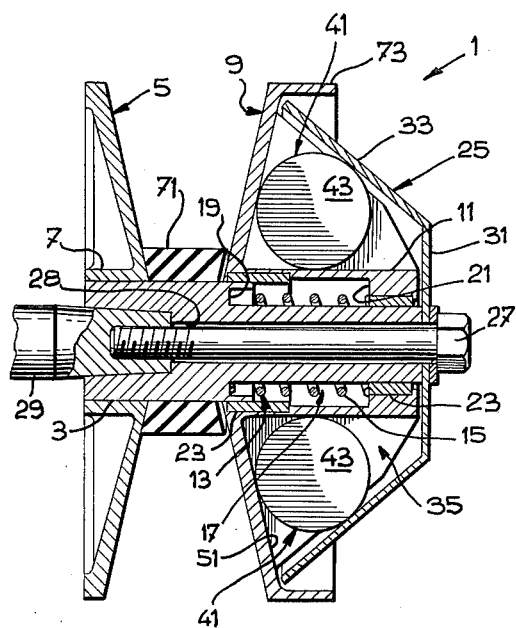
FIG. 1 is a cross-section view of the centrifugally operated, variable diameter, pulley at rest.
Figure 2:
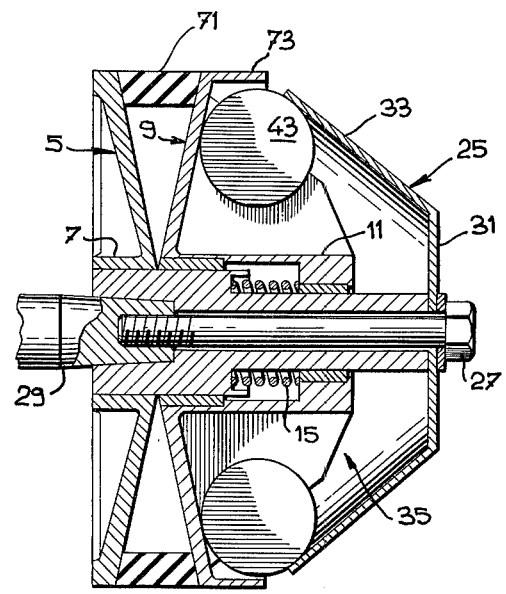
FIG. 2 is a cross-section view of the pulley in operation.

The variable diameter pulley 1 of the present invention, as shown in FIGS. 1 and 2 has a rotatable axle 3. A first, annular, frusto-conical pulley flange 5 is concentrically fixed, by a hub 7, on the axle 3 by welding or other suitable means. A second, annular, frusto-conical pulley flange 9 is concentrically mounted, by a relatively long hub 11, on axle 3. The flange 9 is free to move axially along axle 3, and also to rotate about the axle.

Means 13 are provided to normally bias flange 9 away from flange 5. The means 13 preferably comprise a helical coil compression spring 15 mounted about the axle 3 in an annular space 17 beneath the hub 11. One end of the spring 15 butts against an annular shoulder 19 on the axle 3 and the other end of the spring 15 butts against an annular abutment or stop 21 on the end of hub 11. Bushings 23 can be provided on the inner surfaces of stop 21, and the hub 11 adjacent flange 9, to bear on axle 3.

A cover 25 is detachable, fixedly mounted on axle 3 adjacent the end of hub 11. The cover 25 is fixed to the end of axle 3 by a bolt 27. The bolt 27 passes through a bore 28 in axle 3 and is threaded into the end of a power shaft 29 to attach the assembly thereto. The cover 25 has a first inner annular wall portion 31 which extends generally perpendicular to axle 3 and a second outer annular wall portion 33, extending from wall portion 31, which angles toward outer peripheral edge of flange 9. An annular space 35 is thus provided between cover 25 and flange 9 for receiving means 41, operated by centrifugal force, which move flange 9 toward flange 5, and away from cover 25 as will be described.

The centrifugal force operated means 41 comprise at least two roller means 43. Each roller means 43 comprises a circular disk. These disks are preferably made from plastic material to minimize wear.

Figure 3:
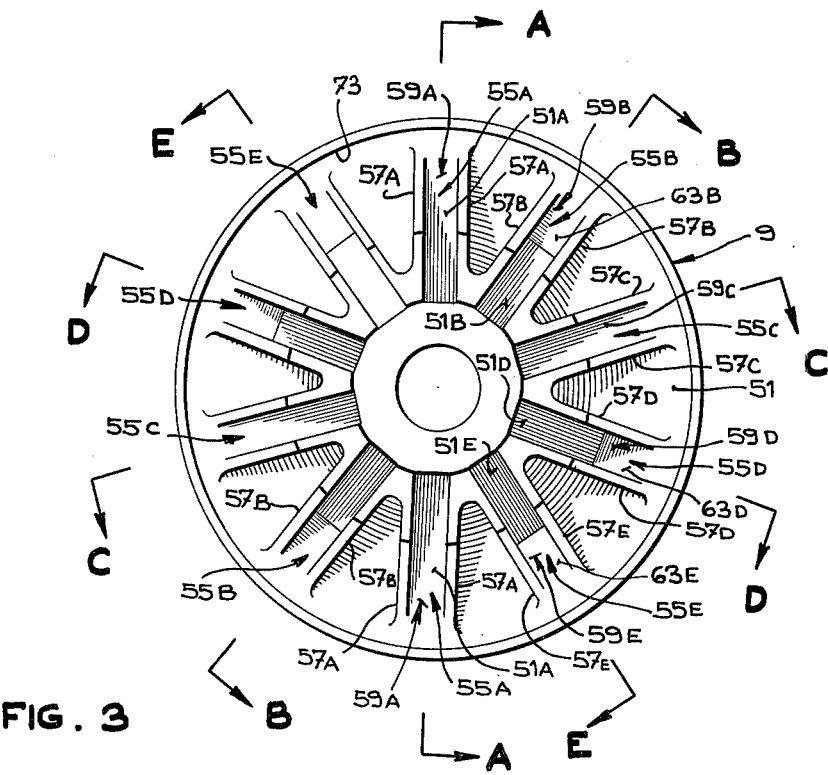
FIG. 3 is an elevation view of one of the pulley flanges showing the guide means for the centrifugally movable members.

The second flange 9, on its annular surface 51 facing cover 25, has guide means 53 for receiving the disks 43 as shown in FIGS. 3 and 4. The guide means 53 comprise at least two, and preferably more, sets of radially extending grooves 55. Each set of grooves is equally spaced about the axle 3 and comprises two grooves 55, with the two grooves of each set 55A, 55B, etc. lying on the same diametric line passing through the longitudinal center of axle 3.

Figure 4A:
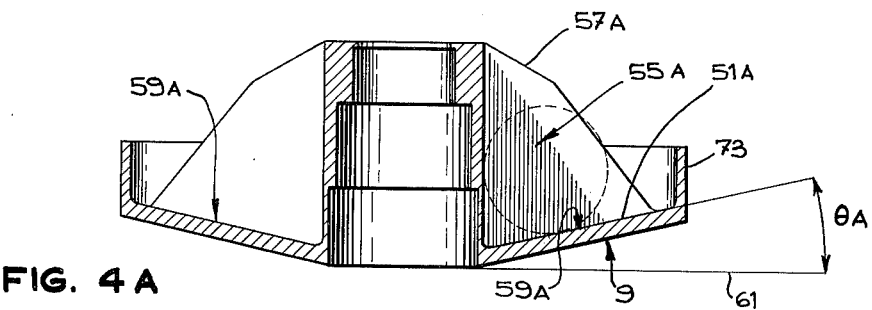
FIGS. 4A to 4E are cross-section views of the pulley flange taken along lines A—A to E—E respectively in FIG. 3.
Figure 4B:
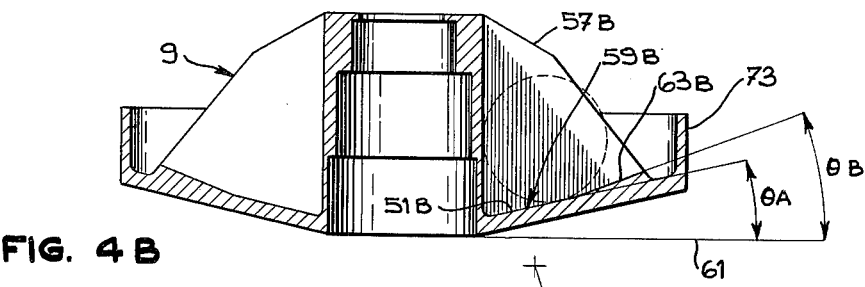

To accomodate the circular disks 43, each groove 55 is defined by a pair of spaced-apart, parallel flanges 57 extending away from the surface 51 of flange 9. In the present embodiment, the base 59A, 59B, etc. of each pair of grooves 55A, 55B, etc. is different, in accordance with the invention. The base 59A of the pair of grooves 55A comprises in its entirety, a portion 51A of surface 51. Surface 51 extends at an angle $\theta$ A to the perpendicular line 61 of axle 3 as does surface portion 51A as shown in FIG. 4A. The base 59B of the grooves 55B comprises an inner radial portion 51B of surface 51 and an outer radial portion 63B which extends at an angle $\theta$ B to the perpendicular line 61 as shown in FIG. 4B. The angle $\theta$ B is slightly greater than the angle $\theta$ A at which inner radial portion 51B extends. The length of both base portions 51B and 63B is again about the same.

Similarly, the base 59D and 59E of groove pairs 55D and 55E respectively each comprises two portions. Base 59D has an inner radial portion 51D and an outer radial portion 63D. Radial portion 63D extends an angle $\theta$ D to the perpendicular line 61. Angle $\theta$ D is greater than angle $\theta$ B. Base 59E has an inner radial portion 51E and an outer radial portion 63E. Radial portion 63E extends at an angle $\theta$ E to the perpendicular line 61. Angle $\theta$ E is greater than angle $\theta$ D. As with groove pair 55B, the base portions 51D and 63D, and 51E and 63E of groove pairs 55D and 55E respectively, are generally equal in length.

During manufacture of the pulley 1, the pair of disks 43 are inserted into one of the four groove pairs 55A, 55B, 55D or 55E. The disks 43 are inserted during the manufacture of the pulley before cover 25 is attached to hold the disks in place.

In the at-rest position of the assembled pulley, as shown in FIG. 1, the disks 43 touch hub 11, flange 9 and wall 33 of cover 25, and are located in the innermost radial portion of the grooves due to the force of spring 15. In this position, the belt 71, driven by pulley 1 lies against axle 3. When power shaft 29 is rotated, pulley 1 is also rotated. Centrifugal force causes disks 43 to roll radially outwardly in the selected grooves to the end of the grooves which is closed by a circular flange 73 on flange 9. During this rolling movement, the flange 9 is moved away from cover 25 as the disks move along angled cover wall 33, and toward flange 5. This causes belt 71 to be engaged between the flanges and then to move radially outwardly.

The bases 59 of the grooves 55 provide the path along which the disks 43 are guided during their radial outward movement. If the pulley 1 is to be installed on a low powered, low speed vehicle, the disks 43 would be placed in grooves 55A, or perhaps grooves 55B. In these grooves the disks move flange 9 relatively slowly and, evenly, or nearly evenly, toward flange 5 to obtain slow but relatively even acceleration. If the pulley however is to be used on higher speed machines, the disks 53 may be placed in grooves 55D or even grooves 55E. In these grooves, having a more sharply bent path toward wall portion 33 of cover 25, the flange 9 is thrust more quickly toward flange 5 near the end of travel of the disk to obtain faster acceleration. The greater the bend in the base 59 the quicker the machine reaches top speed.

Figure 4C:
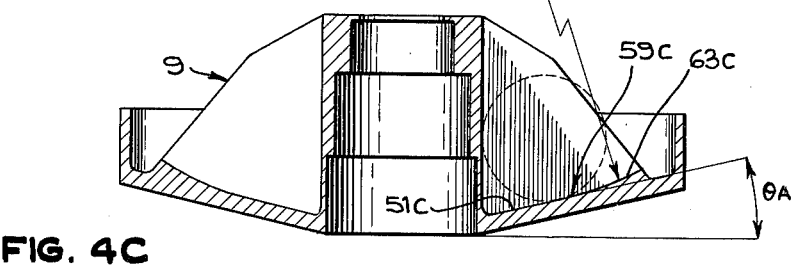
Figure 4D:
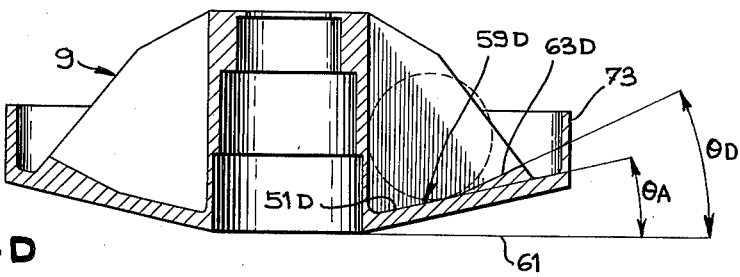
Figure 4E:
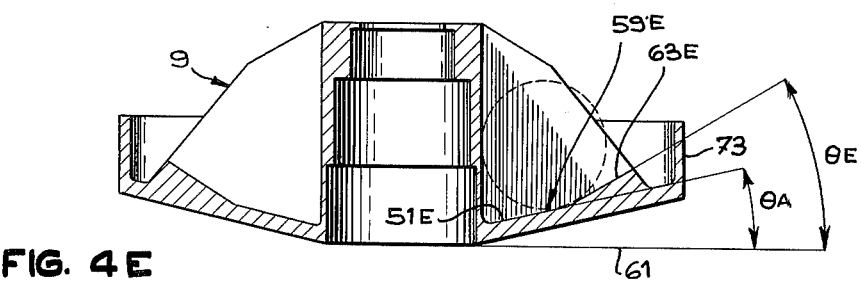

If desired, the base radial portion 63C of base 59C of the grooves 55C could be curved instead of angled as shown in FIG. 4C. Groove sets could be provided with different rates of curvature.

I claim:
1. A centrifugally-operated, variable diameter pulley, including:
   a rotatable axle;
   a first pulley flange fixed on said axle;
   a second pulley flange rotatably mounted on said axle outwardly of said first pulley flange, and movable axially therealong toward and away from said first pulley flange;
   a cover member fixed to said axle outwardly of said second pulley flange, and including an outer annular wall portion arranged to angle inwardly toward said axle and the periphery of said second pulley flange;
   means on the outer face of said second pulley flange defining at least two circumferentially spaced sets of radially extending grooves arranged to face said cover member, each of said grooves including a pair of generally parallel, axially extending side walls, and a base wall inclined toward said axle and said cover member, at least the radially outer portions of said base walls being inclined toward said axle and said cover member at an angle that differs for each set of grooves;
   and a circular disc received in each groove of a selected one of said sets of grooves, said circular discs being unattached to said second pulley and said cover member, and being constrained by said generally parallel side walls of their associated grooves to movements only in a radial direction;
   said circular discs being moved radially outwardly in their respective grooves by centrifugal force when said axle is rotated in engagement with said inclined base walls of their respective grooves and said inclined annular wall portion of said cover member, whereby said rotatable and slidable second pulley flange is moved toward said fixed first pulley flange.
2. A centrifugally-operated, variable diameter pulley as recited in claim 1, including additionally:
   means arranged to normally bias said second pulley flange away from said first pulley flange, and toward said cover member, said means being effective to urge said circular discs to move radially inwardly as the rotational speed of said axle is reduced.
3. A centrifugally-operated, variable diameter pulley as recited in claim 1, wherein the base walls of the grooves of at least one of said sets each include a radially inner portion and a radially outer portion, said radially outer portions being inclined toward said axle and said cover member at a greater angle than said radially inner portions.

4. A centrifugally-operated, variable diameter pulley as recited in claim 1, wherein said grooves are defined by axially directed, radially extending, parallel flanges provided on said outer face of said second pulley flange.

5. A centrifugally-operated variable diameter pulley as recited in claim 1, including additionally:
an axially extending, circular flange on the periphery of said second pulley means, arranged to extend toward said cover member and adapted to stop the radially outward movements of said circular discs.

* * * * *